United States Patent
Kienzle-Lietl

(10) Patent No.: US 7,757,946 B2
(45) Date of Patent: Jul. 20, 2010

(54) MATERIAL TRANSPORT IN-MOTION PRODUCT DIMENSIONING SYSTEM AND METHOD

(75) Inventor: Kathleen G. Kienzle-Lietl, Barrington, IL (US)

(73) Assignee: Acme Scale Company, Inc., Villa Park, IL (US)

( * ) Notice: Subject to any disclaimer, the term of this patent is extended or adjusted under 35 U.S.C. 154(b) by 230 days.

(21) Appl. No.: 11/108,271

(22) Filed: Apr. 18, 2005

(65) Prior Publication Data

US 2005/0240317 A1 Oct. 27, 2005

Related U.S. Application Data

(60) Provisional application No. 60/562,961, filed on Apr. 16, 2004.

(51) Int. Cl.
G06F 19/00 (2006.01)
(52) U.S. Cl. .................... 235/384; 235/383
(58) Field of Classification Search ............. 235/384, 235/383; 356/376, 379; 700/215
See application file for complete search history.

(56) References Cited

U.S. PATENT DOCUMENTS

| | | | |
|---|---|---|---|
| 3,819,918 A | 6/1974 | Hale | |
| 4,402,609 A | 9/1983 | Fetzer et al. | |
| 4,605,081 A * | 8/1986 | Helmly et al. | 177/25.13 |
| 5,184,733 A | 2/1993 | Amarson et al. | |
| 5,526,615 A * | 6/1996 | Kaizu et al. | 52/79.6 |
| 5,636,028 A | 6/1997 | Stringer et al. | |
| 5,699,161 A | 12/1997 | Woodworth | |
| 5,854,679 A | 12/1998 | Bourgoin et al. | |
| 5,864,404 A | 1/1999 | Amorosi | |
| 5,903,354 A | 5/1999 | Bengala et al. | |
| 5,923,428 A | 7/1999 | Woodworth | |
| 5,991,041 A | 11/1999 | Woodworth | |
| 6,011,255 A | 1/2000 | Rueb et al. | |
| 6,061,645 A | 5/2000 | Bengala et al. | |
| 6,137,577 A * | 10/2000 | Woodworth | 356/623 |
| 6,611,787 B2 * | 8/2003 | Stringer et al. | 702/159 |
| 6,618,155 B2 | 9/2003 | Metcalfe et al. | |
| 6,669,089 B2 * | 12/2003 | Cybulski et al. | 235/385 |

(Continued)

FOREIGN PATENT DOCUMENTS

EP 548464 6/2003

(Continued)

OTHER PUBLICATIONS

Specification sheet for LMS 200/291 Volume Measurement System from Sick Ag; available at www.sickusa.com, pp. 88, 112 and 113.

*Primary Examiner*—Thien M Le
(74) *Attorney, Agent, or Firm*—Barnes & Thornburg LLP

(57) ABSTRACT

Methods, systems, and devices to obtain dimensions of an article or product in association with material handling vehicles are disclosed. A dimension detection device is installed in an enclosure and is used to acquire geometrical dimensions of the object in association with the vehicle. A predetermined dimension of the vehicle is subtracted from the overall detected dimension to determine the dimensions, including weight, of the product alone. One or more dimension detection devices may also be positioned on a mast or other portion of the material handling vehicle allowing the material handling vehicle to act as a mobile product dimensioning system.

23 Claims, 4 Drawing Sheets

U.S. PATENT DOCUMENTS

| | | |
|---|---|---|
| 6,767,175 B2 | 7/2004 | Fujita et al. |
| 2001/0041948 A1* | 11/2001 | Ross et al. ................ 700/226 |
| 2002/0001091 A1 | 1/2002 | Wurz et al. |
| 2002/0093667 A1 | 7/2002 | Hoffmann |
| 2003/0042303 A1 | 3/2003 | Tsikos et al. |
| 2003/0042304 A1 | 3/2003 | Knowles et al. |
| 2003/0080192 A1 | 5/2003 | Tsikos et al. |
| 2003/0184737 A1 | 10/2003 | Gehring |
| 2004/0102870 A1* | 5/2004 | Andersen et al. ............ 700/215 |

FOREIGN PATENT DOCUMENTS

| | | |
|---|---|---|
| JP | 59-174722 | 10/1984 |
| JP | 61-031906 | 2/1986 |

\* cited by examiner

MATERIAL TRANSPORT IN-MOTION PRODUCT DIMENSIONING SYSTEM AND METHOD

RELATED APPLICATION

This application claims the benefit of U.S. Provisional Application No. 60/562,961 filed Apr. 16, 2004, the disclosure of which is hereby incorporated by reference in its entirety.

BACKGROUND AND SUMMARY

Product handling, classification, and distribution systems employ a variety of methods to determine dimensions of freight, cargo, and the like. A dimension is a calculation of length, width, and height of an object, and for purposes of this disclosure, a weight can also be included. Product dimensioning is used for a variety of purposes including product consistency, inventory monitoring, revenue enhancement for the transportation industry, and placement onto air, rail, and ground transport vehicles. Product dimensioning may also be used for security purposes, such as monitoring for cargo of unusually large weight being loaded onto an airplane for purposes of weight and balance, revenue calculations, and other purposes. An unusual weight may indicate that something other than the reported contents is present, such as components for a bomb or other weapon.

Current systems employ a variety of techniques, including stationary or static dimensioning or manual dimensioning. Conveyor systems also exist that pass objects of various dimension through laser curtains, or image such objects using cameras, that then use computers to determine dimension. In such systems, a product is placed on a conveyor and is conveyed through a "U" shaped tunnel that uses laser scanning to capture the dimension in motion. Such systems can be effective for small parcels that are bundled downstream of the conveyor. However, this process can be time consuming for applications that require large quantities of products, possibly of varying sizes, such as, for example, quantities that fill an entire forklift pallet, or lift truck. Current systems present several inefficiencies in this situation related to unloading the truck, passing the items individually through the conveyor, and reloading the truck. There is a need to scan an entire pallet or entire truck load contemporaneously, in a fast, automated process.

Briefly, and in accordance with the foregoing, disclosed is a system and method for determining the dimension and weight of products on or in forklifts, pallets, or lift trucks. One embodiment of the present system and method employs a tunnel or some other defined space defining a space sufficient to allow passage of a material handling vehicle. The tunnel is equipped with one or more dimension detection devices positioned to capture the entire dimension of the material handling vehicle and product positioned thereon. Alternatively, the tunnel is fitted with scanning technology suitable for detecting product edges that have been treated with detectable paint, tape, wrapping or other dimension detection device, thereby allowing the dimensions to be the net of the transport vehicle. The present system also includes a computer system in communication with the tunnel, for receiving data therefrom. The computer system subtracts a predetermined or recalled dimension for the material handling vehicle from the total dimension of the product and material handling vehicle to determine the dimensions of the product alone.

Another embodiment of the present disclosure employs one or more dimensioning device(s) mounted at a location on a lift truck. This feature allows the lift truck to become a mobile product dimensioning system.

BRIEF DESCRIPTION OF THE DRAWINGS

The drawings are provided to illustrate some of the embodiments of the disclosure. It is envisioned that alternate configurations of the embodiments of the present disclosure maybe adopted without deviating from the disclosure as illustrated in these drawings.

Figure 1:
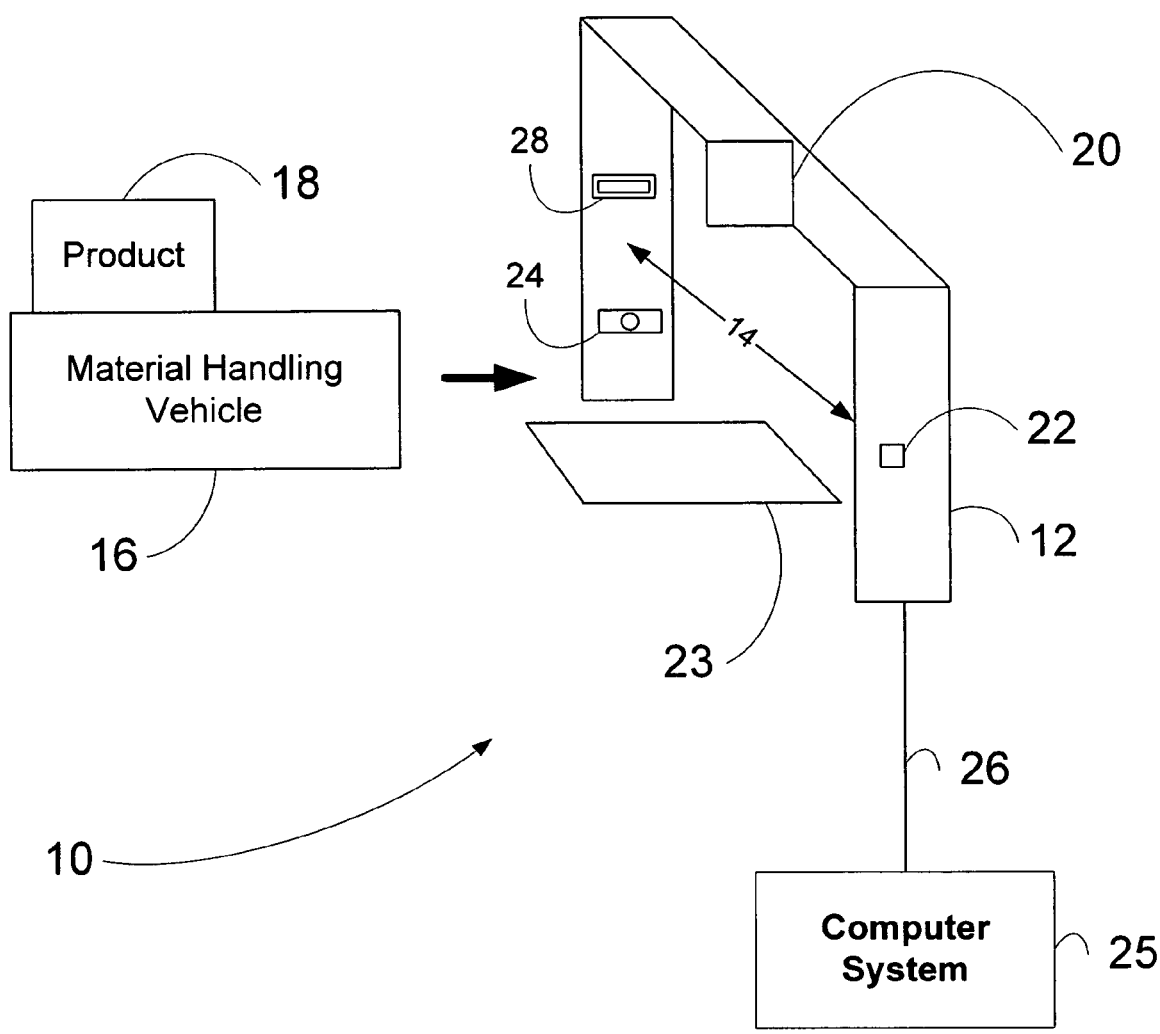
FIG. 1 is a simplified diagrammatic view of a system for dimensioning product while aboard a material handling vehicle.

The exemplification set out herein illustrates embodiments of the disclosure that is not to be construed as limiting the scope of the disclosure in any manner.

DETAILED DESCRIPTION OF THE DISCLOSURE

While the concepts of the present disclosure are illustrated and described in detail in the drawings and the description below, such an illustration and description is to be considered as exemplary and not restrictive in character, it being understood that only the illustrative embodiment is shown and described and that all changes and modifications that come within the spirit of the disclosure are desired to be protected.

The term "product" or "article" as used in this disclosure refers to any physical entity such as, for example, but not limited to, a manufactured product, cargo, and any other material that is transported including live animals, plants, and people. It is thus envisioned that the current system may be used to determine the weight of people aboard a transportation vehicle, such as a bus. The term material handling vehicle is meant to broadly include transportation vehicles such as, for example, but not limited to, a fork lift truck, a flatbed truck, or a pallet truck.

FIG. 1 is a simplified diagrammatic view of a system 10 for dimensioning product loaded onto a material handling vehicle. System 10 includes a passage or tunnel 12 defining a passage or space 14 large enough for passage of a material handling vehicle 16 and product 18 present thereon to pass therethrough. Tunnel 12 may be any enclosure or structure suitable for allowing such passage, including a flexible canopy, or rigid structure, such as a structure constructed from metal or plastic. Product 18 may be of any shape including cubic, cylindrical, spherical, or irregular in shape and may not be in a package, but may be in a conformal fitting covering, such as a fabric, sheet or other irregular generally form-defined cover. Although an inverted U-shaped tunnel is shown, tunnel 12 may be any shape including any combination of a bottom and two side structures defining a plane through which a material handling vehicle 16 may pass.

Tunnel 12 is fitted with at least one dimension detection device 20 such as a laser scanner. Dimension detection device (s) 20 is positioned along tunnel 12 to allow for detection generally as vehicle 16 passes therethrough. One or more detection devices 20 may also be angled or positioned to scan vehicle 16 during approach toward tunnel 12 or after exit of tunnel 12. One laser scanner suitable for use in system 10 is manufactured by SICK AG (Düsseldorf, Germany; catalog numbers: VMS 200, VMS 400). Other detection devices 20 that can be used include radio-frequency sensors, ultrasound sensors, inductive, capacitive or magnetic proximity sensors, magnetic cylinder sensors, photoelectric switches, contrast and luminescence scanners, color sensors, fork photoelectric switches, light grids, distance sensors, position finders, and light-section sensors, vision capture, and cameras.

System 10 may be operated continuously or activated upon entry of vehicle 16. As such, system 10 may be fitted with a motion detector 22. System 10 may also include a weighing system 23 for weighing the combined vehicle 16 and product 18. The weight determined by the weighing system 23 may be used in combination with visual and other dimensioning technologies that can be employed in the current system 10.

System 10 may also include a scanner or barcode reader 24 of known construction. Barcode reader 24 is mounted on or in the vicinity of tunnel 12 or may be a handheld barcode reader 24 for manual operation. Barcode reader 24 may read industry standard barcode, and can also be any other machine vision system for scanning or detecting indicia. Barcode reader 24 is used to determine the identity and other information about vehicles 16 passing through tunnel 12, provided vehicle 16 has been fitted with a suitable barcode label or has other detectable indicia thereon. Other vehicle information contained in the bar code may be a vehicle identification number, vehicle class code, and vehicle dimension including weight and load capacity.

System 10 also includes a computer system 25 in communication with tunnel 12 via communications path 26, which may be any suitable wired or wireless connection. Computer system 25, may be a stand-alone computer, server, or computer attached to a network, intranet, or the Internet. Computer system 25 may also be, but is not limited to, a handheld device, PDA, laptop, or other mobile computing and data collection device. Computer system 25 receives dimensioning data from detection devices 20 and processes such data as described below. In an embodiment having a barcode reader 24, barcode reader 24 is also in communication with computer system 25, either through direct wired or wireless connection, or indirectly, such as the barcode reader 22 being attached to computer system 25 via tunnel 12.

Vehicle 16, product 18, or both vehicle 16 and product 18 can be marked distinguishably with an appropriate material such as, for example, but not limited to, a fluorescent or reflective paint, a marker tape, covering or any other identifiable material or substance. Where such marking is desired, system 10 may also include an optical detection device 28 such as, for example, a fluorescence scanner, to discriminate between the vehicle 16 and product 18. The optical detection device 28 and a laser detection devices 20 can be synchronized to operate in tandem to obtain and process the dimensions of the product 18 and/or vehicle 16. A hybrid optical detection and dimension detection device may be used as well.

Figure 2:
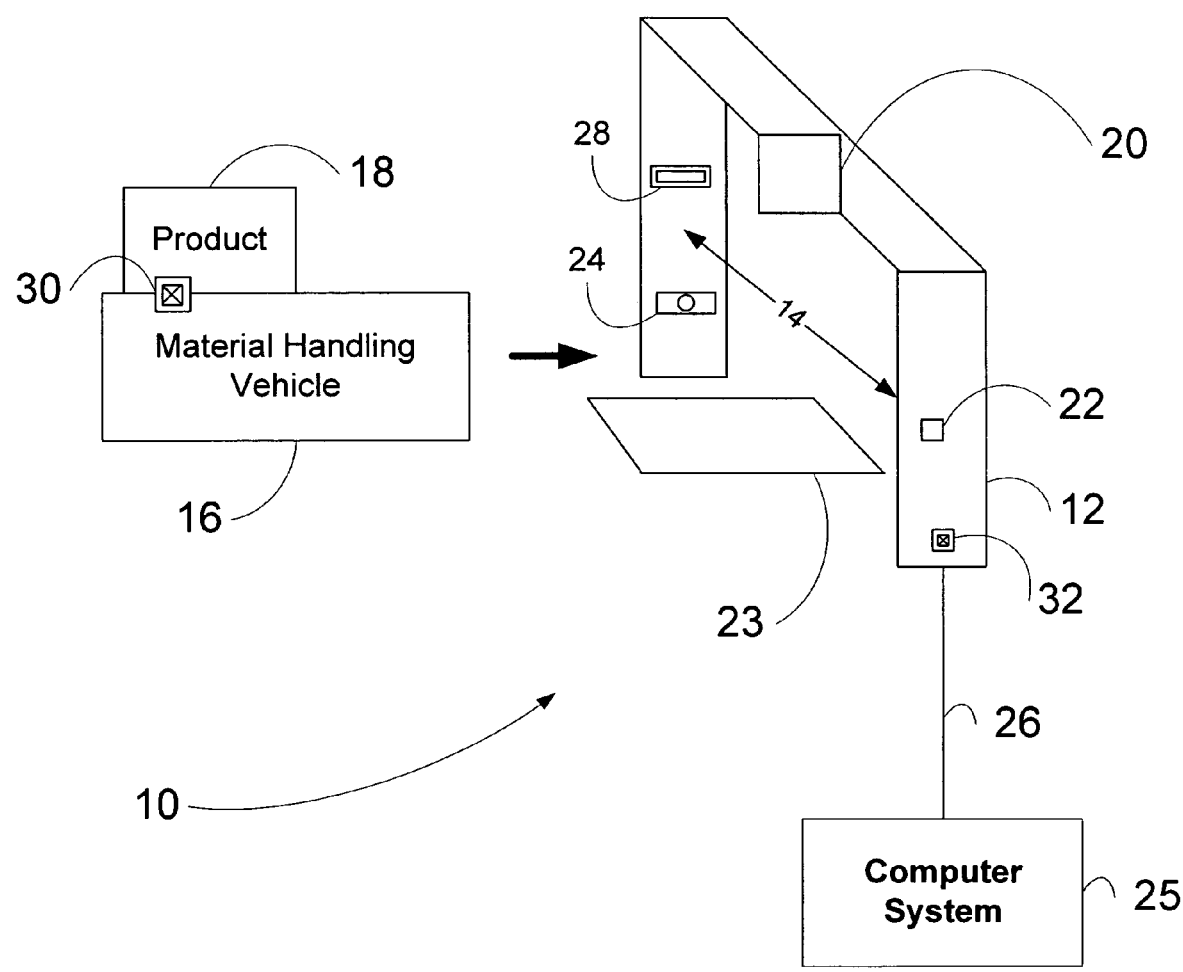
FIG. 2 is another embodiment of the system of FIG. 1.

As shown in FIG. 2, in another embodiment, Vehicle 16 or product 18 may also be fitted with an radio frequency identification (RFID) tag 30 for detection by a radio frequency transceiver 32 in communication with tunnel 12 and/or computer system 25 to identify the vehicle 16 and/or product 18. Computer system 25 may also include standard input devices, such as a keyboard, touch and/or voice control for manual entry of details identifying product 18 or vehicle 16.

Figure 4:
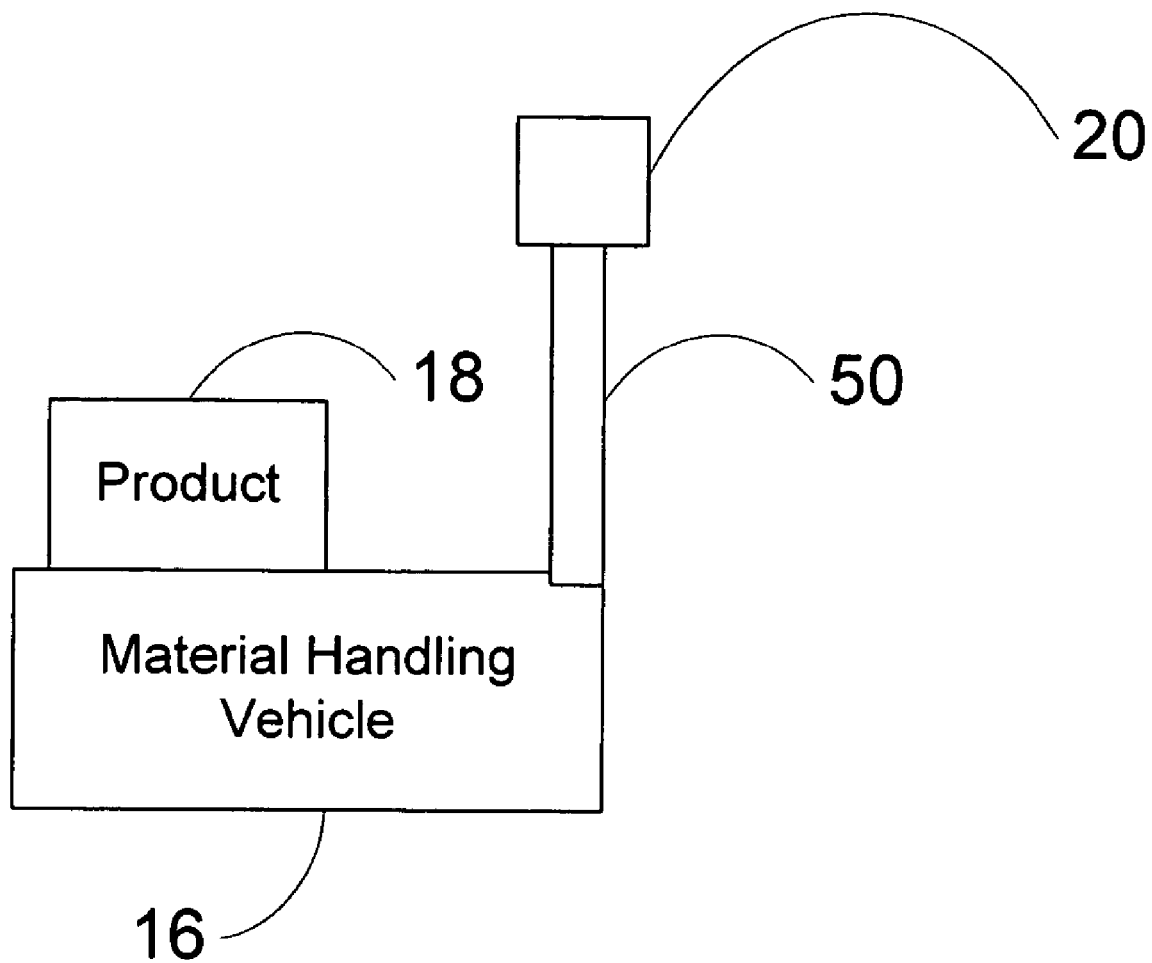
FIG. 4 is another embodiment of the system of FIG. 1.

Another embodiment of the present disclosure is shown in FIG. 4 which shows detection device 20 being mounted on a mast 50 of vehicle 16. Mast 50 generally refers to a portion of vehicle 16 used to support, raise, and/or lower a pallet or other product carrying structure. Placement of detection device 20 obviates the need for a separate tunnel. In this manner, vehicle 16 becomes a mobile dimensioning device. Although one detection device 20 is shown, additional detection devices 20 may be positioned at other locations on vehicle 16 as well. The plurality of detection devices 20 may be used separately or in combination to dimension product on vehicle 16. Detection device 20 may also be positioned on a location of vehicle 20 other than on the mast 50 and still allow dimensioning without the use of a tunnel, such as the ceiling of vehicle 20, framework, or other support structure.

Computer system 25 contains or is in communication with one or more software modules to process the geometrical dimensions data to obtain dimension measurements. The term "computer module" or "software module" referenced in this disclosure is meant to be broadly interpreted and cover various types of software code including but not limited to routines, functions, objects, libraries, classes, members, packages, procedures, methods, or lines of code together performing similar functionality to these types of coding. The components of the present disclosure are described herein in terms of functional block components, flow charts and various processing steps. As such, it should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, SQL, C++, Java, COBOL, assembler, PERL, or the like, with the various algorithms being implemented with any combination of data structures, objects, processes, routines or other programming elements. Further, it should be noted that the present disclosure may employ any number of conventional techniques for data transmission, signaling, data processing, network control, and the like as well as those yet to be conceived.

Data collected from tunnel 12 and associated detection devices 20, and any other user input devices, is used to calculate the dimensions of the product. Computer system 25 can also be programmed to interface with any other database to generate freight codes and transportation costs, calculate inventory, quality control based on product size, and make adjustments to warehouse management records.

Figure 3:
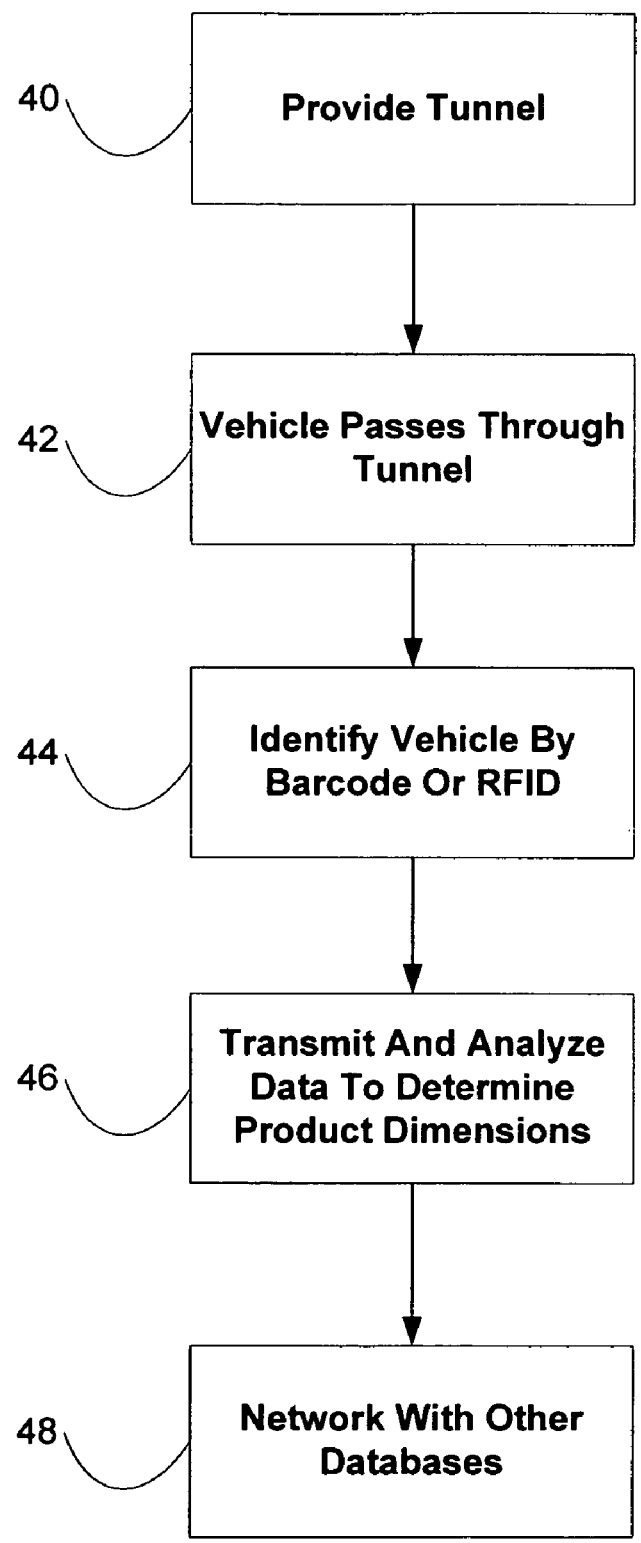
FIG. 3 is a flowchart showing the steps of calculating the dimensions of the product of FIG. 1.

FIG. 3 shows the steps in a method of obtaining product 18 dimensions, while product 18 is present on material handling vehicle 16. In a first step 40, a tunnel 12 is provided having at least one dimension detection device 20 such as a laser scanning measurement system. In a second step 42, the detection device 20 is operated generally as vehicle 16 passes through a passage or opening 14 in the tunnel 12. The detection device(s) are operated to acquire data corresponding to the dimensions of product 18 that is present on vehicle 16. In a third step 44, vehicle 16 may be identified by scanning indicia thereon, such as by reading a barcode using a barcode reader 24. Alternatively, an RFID tag associated with the vehicle 16 or product 18 may be operated to send a signal containing identification information to tunnel 12.

In a fourth step 46, the data is transmitted to a computer system 25 for analysis. The software module loaded onto the computer system 25 is used to calculate the dimensions, including weight, of the product alone. This may be achieved by discriminating the boundaries of vehicle 16 by a distinguishing paint or tape, or otherwise obtaining the dimensions of the vehicle alone, and subtracting that dimension from the overall dimension of vehicle 16 and product 18. The dimension of vehicle 16 may have been previously determined or stored in computer system 25 and can thus be retrieved for this calculation. The retrieved or calculated dimension of vehicle 16 is shall be referred to as a "known dimension" in this disclosure. The vehicle's dimension may also be part of the information retrieved from the bar code or RFID tag. Alternatively, the dimension of vehicle 16 can be determined based on manufacturer's specifications for that particular vehicle 16. Finally, the weight of vehicle 16 may have been determined using the weighing system 23 when vehicle 16 was previously run through tunnel 12 without any product 18 loaded thereon where applicable if the material handling vehicle 16 is passing over a floor scale. Alternatively, the weight of the product can be ascertained from a vehicle mounted scale or gauge.

In another step 48, with the dimension of the product 18 being determined, the computer system 25 can network or interface with other databases related to freight classification, storage or cargo space requirements, that may be useful if the product is being loaded onto larger transport vehicles, compliance with government regulations, customs rules, and so forth.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A system for dimensioning at least one discrete article carried on a material handling vehicle, the system comprising:
    a passage, the passage defining a space sufficient to allow passage of a material handling vehicle having a portion adapted to support, raise and lower a pallet carrying an article, the material handling vehicle having at least one known linear dimension;
    at least one active linear dimension detection device for determining a combination dimension, the combination dimension being an aggregate linear dimension of the at least one discrete article carried on the material handling vehicle and the material handling vehicle; and
    a computer system in communication with the at least one linear dimension detection device, the computer system being adapted to determine at least one linear dimension of the article by subtracting the known linear dimension from the combination dimension.

2. The system of claim 1, further comprising the at least one linear dimension detection device being positioned along the passage.

3. The system of claim 1, further comprising the at least one linear dimension detection device being one or more of a laser scanner, a radio-frequency sensor, an ultrasound sensor, an inductive capacitance sensor, a magnetic proximity sensor, a magnetic cylinder sensor, a photoelectric switch, a contrast luminescence scanner, a color sensor, a fork photoelectric switch, a light grid, a distance sensor, a position finder, a light-section sensor, a vision capture, and a camera.

4. The system of claim 1, further comprising a machine readable code on the material handling vehicle, the machine readable code being for one of identifying the material handling vehicle to retrieve the known linear dimension and communicating the known linear dimension.

5. The system of claim 4, further comprising the machine readable code being one of a barcode and an RFID.

6. The system of claim 1, further comprising an identifiable substance positioned along the boundaries of one of the material handling vehicle and the article, the identifiable substance being detectable by the at least one linear dimension detection device to discriminate between the article and material handling vehicle.

7. The system of claim 6, further comprising the identifiable substance being one of a fluorescent paint, a reflective paint, and a marker tape.

8. The system of claim 1, further comprising the material handling vehicle being one of a fork lift, a lift truck, a flat bed, and a pallet truck.

9. A system for actively dimensioning an article, the system comprising:
    a material handling vehicle,
    at least one active linear dimension detection device attached to a portion of the material handling vehicle, the dimension detection device positioned to move with the vehicle and to actively detect at least one linear dimension of the article when the article is loaded onto the material handling vehicle; and
    a computer system in communication with the at least one linear dimension detection device, the computer system being adapted to determine at least one linear dimension of the article.

10. The system of claim 9, further comprising the portion of the material handling vehicle being a mast.

11. A system for dimensioning at least one discrete article carried on a material handling vehicle, the system comprising:
    a passage, the passage defining a space sufficient to allow passage of a material handling vehicle, the material handling vehicle having at least one known linear dimension, the material handling vehicle being a truck having wheels for moving the vehicle over roadways;
    at least one active linear dimension detection device for determining a combination dimension, the combination dimension being an aggregate dimension of the at least one discrete article carried on the material handling vehicle and the material handling vehicle; and
    a program module in communication with the at least one linear dimension detection device, the program module being adapted to determine at least one linear dimension of the article by subtracting the known dimension from the combination dimension.

12. A method of dimensioning at least one discrete article carried on a material handling vehicle, the method comprising the steps of:
    providing a passage, the passage defining a space sufficient to allow passage of a material handling vehicle, the material handling vehicle having at least one known linear dimension, the material handling vehicle being a truck having wheels adapted to drive the material handling vehicle over roadways;

providing at least one active linear dimension detection device associated with the passage;

passing the material handling vehicle from one side of the passage through the passage so that the material handling vehicle exits the passage;

detecting a combination dimension of the material handling vehicle and the at least one discrete article carried on a material handling vehicle while passing the material handling vehicle through the passage; and determining at least one linear dimension of the article by subtracting the known dimension from the combination dimension.

13. The method of claim 12, further comprising the steps of:

providing a machine readable code on the material handling device; and reading the machine readable code to identify the material handling vehicle to retrieve the known dimension.

14. The method of claim 13, further comprising retrieving the known dimension from the machine readable code.

15. The method of claim 13, further comprising:

providing a computer system in communication with the at least one linear dimension detection device, the computer system being operative to store and retrieve at least one known dimension for at least one material handling vehicle; and retrieving the known dimension for the material handling vehicle from the computer system by identifying the material handling vehicle using the machine readable code.

16. A method of dimensioning at least one discrete article carried on a material handling vehicle, the method comprising the steps of:

providing a material handling vehicle having the article loaded thereon;

positioning an identifiable substance along the boundaries of one of the material handling vehicle and the article; and discriminating between the article and the material handling vehicle by detecting the identifiable substance to detect a linear dimension of the article.

17. The method of claim 16, further comprising:

providing a passage, the passage defining a space sufficient to allow passage of the material handling vehicle;

positioning a material detection device along the passage; and performing the step of discriminating between the article and the material handling vehicle to detect a linear dimension of the article as the material handling vehicle passes through the passage.

18. The method of claim 16, further comprising providing at least one active linear dimension detection device on a portion of the material handling vehicle and performing the step of discriminating between the article and the material handling vehicle to detect a linear dimension of the article when the article is loaded onto the material handling vehicle.

19. The method of claim 18, further comprising detecting a linear dimension of the article while the material handling vehicle is in motion.

20. A method of actively dimensioning an article, the method comprising the steps of:

providing a material handling vehicle;

positioning at least one active linear dimension detection device on a portion of the material handling vehicle and retaining the device thereon to move with the vehicle;

positioning at least one article on the material handling vehicle; and actively detecting at least one linear dimension of the article while positioned on the vehicle using the at least one linear dimension detection device.

21. The method of claim 20, further comprising using the at least one linear dimension to determine at least one of a shipping weight, a freight classification, a compliance with a government regulation, a compliance with a customs rule, and a cargo space requirement.

22. The system of claim 9, further comprising the material handling vehicle being one of a fork lift, a lift truck, a flat bed, and a pallet truck.

23. A method of dimensioning at least one discrete article carried on a material handling vehicle, the method comprising the steps of:

providing a passage, the passage defining a space sufficient to allow passage of a material handling vehicle, the material handling vehicle having at least one known linear dimension;

providing at least one linear dimension detection device associated with the passage;

passing the material handling vehicle from one side of the passage through the passage so that the material handling vehicle exits the passage;

detecting a combination dimension of the material handling vehicle and the at least one discrete article carried on the material handling vehicle while passing the material handling vehicle through the passage;

determining at least one linear dimension of the at least one discrete article by subtracting the known dimension from the combination dimension, and passing a different material handling vehicle having at least one known linear dimension from one side of the passage through the passage so that the different material handling vehicle exits the passage;

detecting a combination dimension of the different material handling vehicle and another at least one discrete article while passing the material handling vehicle through the passage; and determining at least one linear dimension of the another article by subtracting the known dimension from the combination dimension.

* * * * *

(12) INTER PARTES REEXAMINATION CERTIFICATE (1283rd)
United States Patent
Kienzle-Lietl

(10) Number: US 7,757,946 C1
(45) Certificate Issued: Jun. 13, 2016

(54) MATERIAL TRANSPORT IN-MOTION PRODUCT DIMENSIONING SYSTEM AND METHOD

(75) Inventor: Kathleen G. Kienzle-Lietl, Barrington, IL (US)

(73) Assignee: ACME SCALE COMPANY INC., Villa Park, IL (US)

Reexamination Request:
No. 95/001,401, Jul. 20, 2010

Reexamination Certificate for:
Patent No.: 7,757,946
Issued: Jul. 20, 2010
Appl. No.: 11/108,271
Filed: Apr. 18, 2005

Related U.S. Application Data

(60) Provisional application No. 60/562,961, filed on Apr. 16, 2004.

(51) Int. Cl.
*G06F 19/00* (2011.01)
(52) U.S. Cl.
CPC ...................................... *G06F 19/00* (2013.01)

(58) Field of Classification Search
None
See application file for complete search history.

(56) References Cited

To view the complete listing of prior art documents cited during the proceeding for Reexamination Control Number 95/001,401, please refer to the USPTO's public Patent Application Information Retrieval (PAIR) system under the Display References tab.

*Primary Examiner* — My-Trang Ton

(57) ABSTRACT

Methods, systems, and devices to obtain dimensions of an article or product in association with material handling vehicles are disclosed. A dimension detection device is installed in an enclosure and is used to acquire geometrical dimensions of the object in association with the vehicle. A predetermined dimension of the vehicle is subtracted from the overall detected dimension to determine the dimensions, including weight, of the product alone. One or more dimension detection devices may also be positioned on a mast or other portion of the material handling vehicle allowing the material handling vehicle to act as a mobile product dimensioning system.

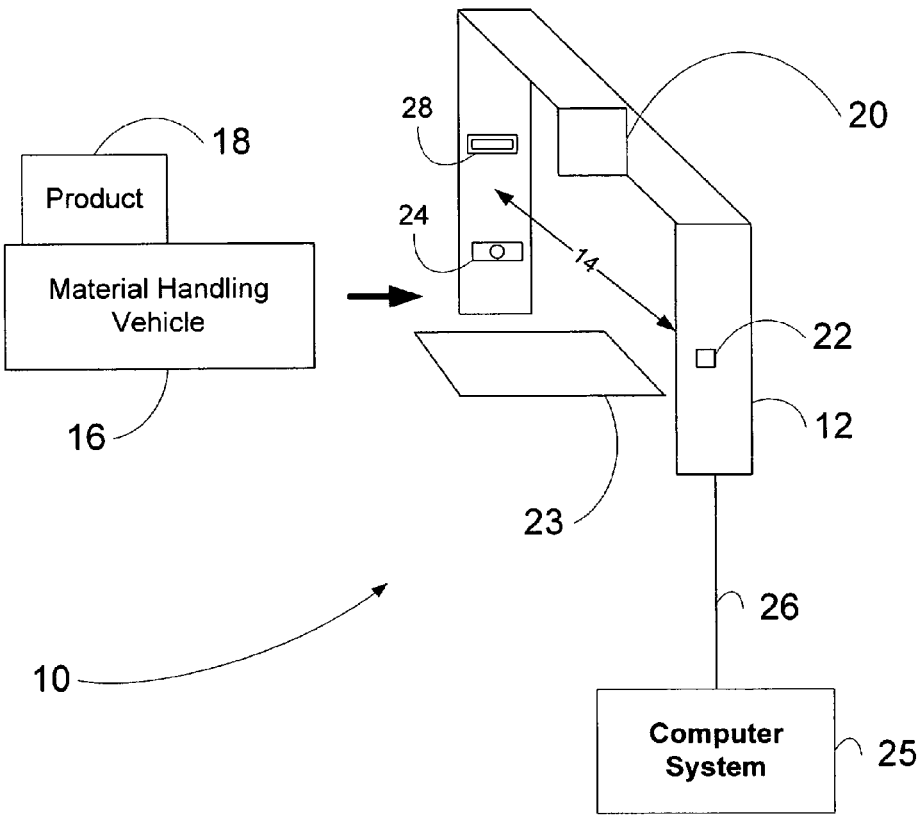

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9, 10 and 20-22 is confirmed.

Claims 1, 11, 12, 16 and 23 are cancelled.

Claims 2-4, 6, 8, 13, 17 and 18 are determined to be patentable as amended.

Claims 5, 7, 14, 15 and 19, dependent on an amended claim, are determined to be patentable.

2. The system of claim [1] *4*, further comprising the at least one linear dimension detection device being positioned along the passage.

3. The system of claim [1] *4*, further comprising the at least one linear dimension detection device being one or more of a laser scanner, a radio-frequency sensor, an ultrasound sensor, an inductive capacitance sensor, a magnetic proximity sensor, a magnetic cylinder sensor, a photoelectric switch, a contrast luminescence scanner, a color sensor, a fork photoelectric switch, a light grid, a distance sensor, a position finder, a light-section sensor, a vision capture, and a camera.

4. [The system of claim 1, further comprising] *A system for dimensioning at least one discrete article carried on a material handling vehicle, the system comprising:*
   *a passage, the passage defining a space sufficient to allow passage of a material handling vehicle having a portion adapted to support, raise and lower a pallet carrying an article, the material handling vehicle having at least one known linear dimension;*
   *at least one active linear dimension detection device for determining a combination dimension, the combination dimension being an aggregate linear dimension of the at least one discrete article carried on the material handling vehicle and the material handling vehicle;*
   *a computer system in communication with the at least one linear dimension detection device, the computer system being adapted to determine at least one linear dimension of the article by subtracting the known linear dimension of the material handling vehicle from the combination dimension; and*
   *a machine readable code on the material handling vehicle, the machine readable code being for one of identifying the material handling vehicle to retrieve the known linear dimension and communicating the known linear dimension.*

6. The system of claim [1] *4*, further comprising an identifiable substance positioned along the boundaries of *and marked on* one of the material handling vehicle and the article, the identifiable substance being detectable by the at least one linear dimension detection device to discriminate between the article and material handling vehicle.

8. The system of claim [1] *4*, further comprising the material handling vehicle being one of a fork lift, a lift truck, a flat bed, and a pallet truck.

13. [The method of claim 12, further comprising the steps of:] *A method of dimensioning at least one discrete article carried on a material handling vehicle, the method comprising the steps of:*
   *providing a passage, the passage defining a space sufficient to allow passage of a material handling vehicle, the material handling vehicle having at least one known linear dimension, the material handling vehicle being a truck having wheels adapted to drive the material handling vehicle over roadways;*
   providing at least one active linear dimension detection device associated with the passage;
   passing the material handling vehicle from one side of the passage through the passage so that the material handling vehicle exits the passage;
   detecting a combination dimension of the material handling vehicle and the at least one discrete article carried on a material handling vehicle while passing the material handling vehicle through the passage;
   determining at least one linear dimension of the article by subtracting the known linear dimension of the material handling vehicle from the combination dimension; and
   providing a machine readable code on the material handling device; and
   reading the machine readable code to identify the material handling vehicle to retrieve the known dimension.

17. The method of claim [16] *18*, further comprising:
   providing a passage, the passage defining a space sufficient to allow passage of the material handling vehicle;
   positioning a material detection device along the passage; and
   performing the step of discriminating between the article and the material handling vehicle to detect a linear dimension of the article as the material handling vehicle passes through the passage.

18. [The method of claim 16, further comprising] *A method of dimensioning at least one discrete article carried on a material handling vehicle, the method comprising the steps of:*
   providing a material handling vehicle having the article loaded thereon;
   positioning an identifiable substance along the boundaries of the article; and
   discriminating between the article and the material handling vehicle by detecting the identifiable substance to detect a linear dimension of the article; and
   providing at least one active linear dimension detection device on a portion of the material handling vehicle and performing the step of discriminating between the article and the material handling vehicle to detect a linear dimension of the article when the article is loaded onto the material handling vehicle.

* * * * *